July 4, 1950   R. D. GAMBRILL   2,513,794
METHOD OF TESTING ELECTRIC CABLES
Filed Dec. 24, 1946   3 Sheets-Sheet 1

INVENTOR
R.D. GAMBRILL
BY *[signature]*
ATTORNEY

July 4, 1950

R. D. GAMBRILL 2,513,794

METHOD OF TESTING ELECTRIC CABLES

Filed Dec. 24, 1946

INVENTOR
R.D. GAMBRILL
BY
ATTORNEY

July 4, 1950 R. D. GAMBRILL 2,513,794
METHOD OF TESTING ELECTRIC CABLES
Filed Dec. 24, 1946 3 Sheets-Sheet 3

INVENTOR
R.D. GAMBRILL
BY [signature]
ATTORNEY

Patented July 4, 1950

2,513,794

UNITED STATES PATENT OFFICE 2,513,794

METHOD OF TESTING ELECTRIC CABLES

Richard D. Gambrill, Baltimore, Md., assignor to Western Electric Company, Incorporated, New York, N. Y., a corporation of New York Application December 24, 1946, Serial No. 718,229

2 Claims. (Cl. 175—183)

This invention relates to methods of testing electric cables, and more particularly to methods of testing lightning protected, coaxial telephone cables.

A coaxial cable is a carrier type of cable now being used extensively in long distance telephone service and to some extent for transmitting both the visual images and the sound for television programs. Such coaxial cables generally consist of a plurality of individual coaxial units formed into a composite conductor core and which is covered with insulation and enclosed in a lead sheath. Long distance telephone cables frequently are buried in the earth, and, therefore, are subject to damage by lightning unless protected therefrom.

It has been found that effective lightning protection of such cables may be obtained by surrounding the lead sheathed cable with a suitable thermoplastic insulating jacket and applying therearound a tubular copper shield, which is in turn covered with a suitable protective material, such as "Leno" cloth tape. With this type of lightning protected cable, the current produced by a lightning strike flows along the outer copper shield, and is prevented by the thermoplastic layer from entering the lead sheath and damaging the cable sheath and conductor core enclosed thereby.

In the manufacture of this type of lightning protected cable, suitable lengths of lead sheathed coaxial cable are advanced through a machine which applies the thermoplastic insulation, the copper shield and the "Leno" cloth tape in successive operations, after which each length of finished cable is wound on a reel. Each reel of cable is electrically tested, the final test being one which is conducted to determine the dielectric strength of the insulation between the lead sheath and the copper shield through the application of a very high D. C. potential across the lead sheath and the copper shield.

Should there be a fault in the thermoplastic insulation, such as a conductive particle embedded therein or a dent in the shield which produces a path of reduced dielectric strength between the shield and the sheath, the insulation will break down at such a point and a high current will flow therethrough. When such a breakdown occurs it is necessary to locate the position of the fault in order that it may be repaired. The present invention relates to methods of and apparatus for locating the position of faults in the insulating jackets of lightning protected cables.

An object of the invention is to provide new and improved methods of testing cables.

A further object of the invention is to provide new and improved methods of locating the position of faults in lightning protected coaxial cables.

One apparatus embodying the invention, which may be used for practicing a method embodying the invention, comprises means for converting a low A. C. potential into a high D. C. potential, which is applied across the copper shield and lead sheath of a lightning protected coaxial cable to break down a fault in the insulation therebetween and cause a current to flow from the sheath through the fault to the copper shield. The apparatus is provided with probing means arranged to engage the copper shield and provide a shunt path for a portion of the current flowing therein, means for indicating when the probes are engaging a current carrying portion of the shield and vice versa, and a low potential ohmmeter circuit arranged to cause a selected value of current to flow through the fault, whereby slight pressure applied against the copper tube in the vicinity of the fault will decrease the resistance of the fault and cause a noticeable change in the current flowing in the circuit.

A clear understanding of the invention will be had from the following detailed description of an apparatus forming a specific embodiment thereof, when read in conjunction with the appended drawings, in which.

Figure 1:
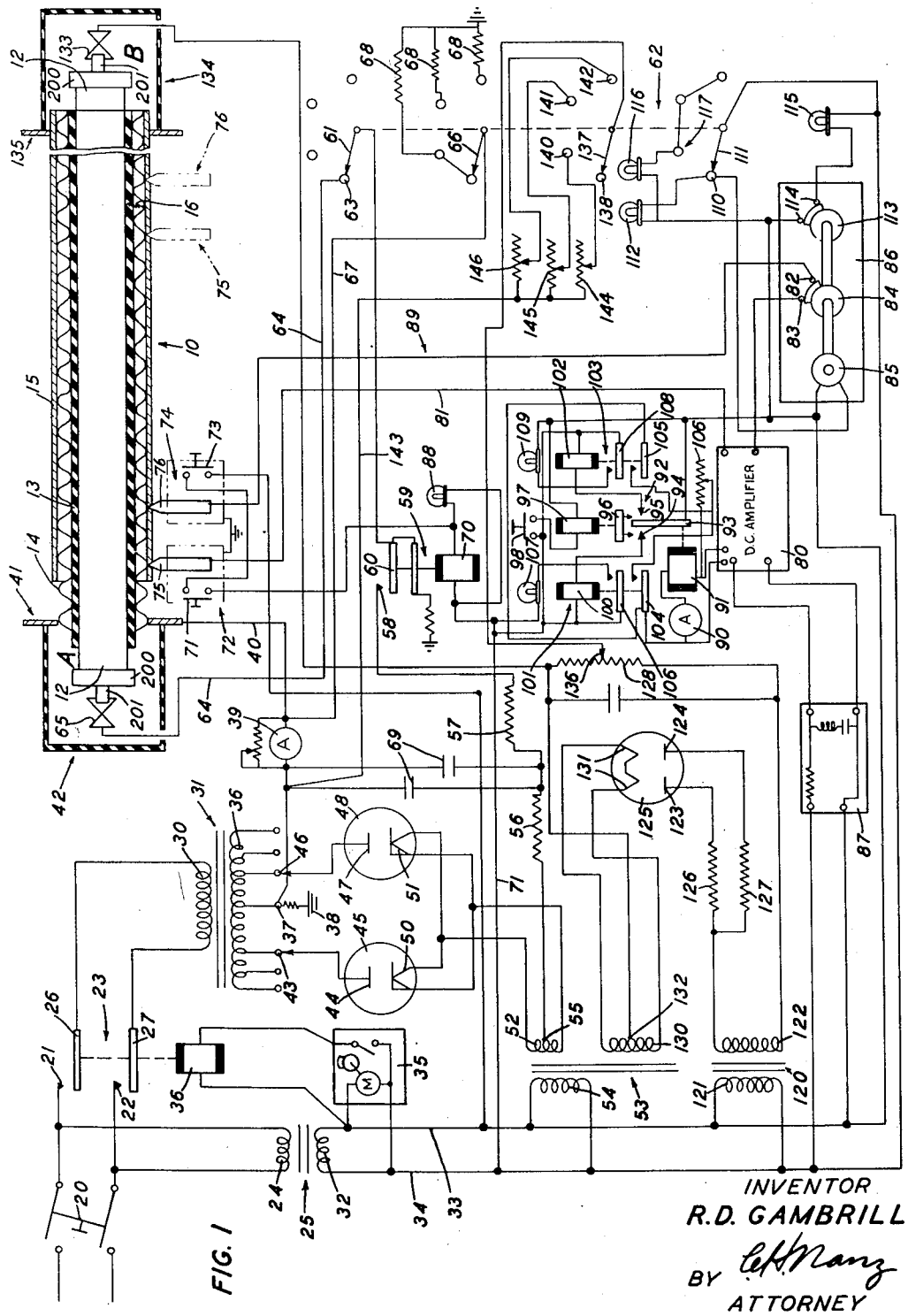
Fig. 1 is a circuit diagram of an apparatus constituting one embodiment of the invention.

Referring now to Fig. 1 of the drawings, it will be noted that there is shown a portion of a lightning protected coaxial cable indicated generally at 10, which for the purpose of clarity will be assumed to be wound on a conventional cable reel in which the left hand end of the cable 10, designated A, will be considered to be the outer end of the cable, while the right hand end, designated B, will be assumed to be the inner end of the cable. The lightning protected coaxial cable 10 comprises a length of coaxial cable 11 having a lead sheath 12 thereon, a thermoplastic insulating jacket 13 round the lead sheath 12, a corrugated copper shield 14 around the thermoplastic jacket 13, and a protective covering of "Leno" cloth tape 15 around the copper shield 14. The cable is wound on a suitable reel, as referred to hereinabove.

In the manufacture of such lightning protected cable, a conductive fault may occur in the insulating jacket 13 which would produce a path of reduced dielectric strength between the lead sheath 12 and the copper shield 14. The faults most likely to occur in the insulating jacket 13 are metallic particles embedded in the insulation or a dent in the copper shield which reduces the amount of insulating material between the copper shield and the lead sheath. In either case, when the cable is subjected to a high D. C. potential to determine the condition of the insulating jacket 13, the fault will cause the jacket to break down at that point. While these faults may take the forms referred to hereinabove, or may be of another nature, such a fault between the copper shield and the lead sheath is indicated generally at 16 as a low resistance path therebetween. If a breakdown should occur at the fault 16, it is necessary to locate the position of the fault so that the cable may be repaired at the defective point, in which case testing apparatus and method embodying the invention are employed to locate the position of the fault with respect to the outer end A of the cable 10 in a manner to be hereinafter described.

A testing apparatus embodying the invention comprises a compact portable testing apparatus 18 (Fig. 2) having an instrument and control panel 19 on which all the indicating meters and control levers of the apparatus are assembled. The testing apparatus comprises a single throw, double pole switch 20 (Fig. 1) which serves to connect stationary contacts 21 and 22 of a magnetic relay 23 and a primary winding 24 of a stepdown transformer 25 to a suitable source of A. C. potential (not shown). Normally open arms 26 and 27 of the relay 23 are connected to a primary winding 30 of a stepup plate transformer 31, which contact arms, when in engagement with the stationary contacts 21 and 22, serve to connect the primary winding 30 directly across the A. C. power supply. The stepdown transformer 25 has its secondary winding 32 connected to supply a low A. C. potential across control busses 33 and 34. A conventional motor driven timer 35, such as a Cramer, TD—2, 120—S timer, is connected directly across the control busses 33 and 34 serves to control the continuity of an operating coil 36 of the relay 23. The transformer 31 is provided with a tapped secondary winding 36, a center tap 37 of which is connected to ground at 38 and also to one side of an ammeter 39. The other side of the ammeter 39 is connected by a lead 40 to an externally operated clamp 41 provided on a connecting hood 42 positioned over the outer end A of the cable 10 so that the clamp 41 engages an exposed portion of the copper shield 14.

A tap 43 (Fig. 1) of the secondary winding 36 is connected to a plate 44 of a mercury vapor rectifier 45. A tap 46 provided on the secondary winding 36 is connected to a plate 47 provided on another mercury vapor rectifier 48, which is identical in size and rating with the rectifier 45. Filaments 50 and 51 of the rectifiers 45 and 48, respectively, are connected in parallel and directly across a secondary winding 52 of a conventional filament transformer 53 having its primary winding 54 connected across the control busses 33 and 34. The secondary winding 52 is provided with a tap 55 to which is connected one end of a current limiting resistor 56 whose other end is connected to another current limiting resistor 57 which in turn is connected to a stationary contact 58 provided on a magnetic relay 59. A normally open contact arm 60 of the relay 59 is connected directly to a movable arm 61 forming part of a four-position, four-deck, manually operated selector switch 62.

The switch 62 (Fig. 1) is shown on the drawing in its normal operating position in which the arm 61 engages a first position contact 63 of its respective deck. The contact 63 is connected by a lead 64 directly to a spring clamp 65 internally disposed in the hood 42, and arranged to engage a prepared end of the lead sheath 12 at the outer end A of the cable 10. The right hand terminal of the ammeter 39 is connected directly to another arm 66 of the selector switch 62 by means of a conductor 67. Each of the four-contact positions engaged by the arm 66 of the switch 62 serves to connect one side of the ammeter to ground through suitable resistors 68—68, which ground is the same ground as that indicated by the numeral 38.

The combination of the stepup transformer 31 (Fig. 1) and the rectifiers 45 and 48 connected to the secondary winding thereof serve to step up the A. C. potential supplied to the transformer and convert the secondary potential to a relatively high D. C. potential of the order of 4500 volts. This high D. C. potential is applied across a circuit, the grounded side of which starts at the tap 37 of the transformer 31, and continues through the ammeter 39, the lead 40 and the clamp 41 of the hood 42 which engages the copper shield 14. The high potential side of the circuit starts at the tap 55 on the secondary winding 52 of the transformer 53 and continues through the resistors 56 and 57 to the contact 58 of the relay 59 and from the arm 60 thereof through the arm 61 and contact 63 of the switch 62 to the clamp 65 which engages the lead sheath 12 of the cable 10. A pair of condensers 69—69 is connected directly across this high D. C. potential circuit ahead of the ammeter 39 and the resistor 57.

An operating coil 70 (Fig. 1) of the relay 59 has one side thereof connected directly to the control bus 34 and the other side thereof connected to one side of a manually operable switch 71 mounted in a probe holder 72. The other side of the switch 71 is connected directly to one side of another manually operable switch 73 mounted in a second probe holder 74, which switch has the other side thereof connected directly to the control bus 33. Hardened steel probes 75 and 76 are secured in the ends of the probe holders 72 and 74, respectively, in a manner hereinafter to be described. Since the probe holders 72 and 74 are identical in construction, only the probe holder 72, shown in Fig. 3 of the drawings, will be described in detail. The probe holder 72 comprises a metallic tubular housing 77 in which the switch 71 is mounted so that its operating lever protrudes beyond the outer periphery of the housing. An annular head 78, made of suitable electrical insulating material, is secured to one end of the housing 77 and has a metallic post 79 secured in a central aperture provided therein. The post 79 is provided with an integral flange by means of which the post is secured to the head 78 and a central aperture in which the probe 75 is adjustably positioned. The head 78 serves to insulate the metallic probe 75 from the metallic housing 77, whereas the post 79 provides a contact surface within the housing 77 which may be electrically connected to a probing circuit 89 to be hereinafter described. The opposite end of the housing 77 has a metallic head secured thereto on which is mounted a conventional cable grip.

The probes 75 and 76 (Fig. 1) are provided with very sharp points so that they may pierce the covering of "Leno" cloth tape 15 and engage the copper shield 14. The housings 77—77 of the probe holders 72 and 74 are connected together and to ground in order to protect an operator when the probes 75 anad 76 mounted therein are in engagement with the current carrying portion of the shield 14. It will be noted that the coil 70 of the relay 61 is connected directly across the busses 33 and 34 by the manually operable switches 71 and 73 in which case they control the continuity of the circuit supplying potential to the coil 70. An indicating lamp 88 is connected directly across the terminals of the operating coil 70 of the relay 59 and serves to indicate when the coil 70 is energized by the closure of the switches 71 and 73.

In the probing circuit 89 (Fig. 1) the probe 75 of the probe holder 72 is connected to one of the input terminals of a conventional, A. C. operated, D. C. amplifier indicated generally at 80 by a conductor 81. The probe 76 is similarly connected to the other input terminal of the D. C. amplifier 80 through a pair of contacts 82 and 83 arranged to be periodically bridged by a cam 84 driven by a motor 85 forming part of a timing apparatus 86. The D. C. amplifier 80 may be of any conventional design; but the type used with this apparatus is the type 715—A, Direct Current Amplifier, manufactured by the General Radio Company. The A. C. operating potential of the D. C. amplifier 80 is obtained from the control busses 33 and 34 and passes through a conventional voltage stabilizer 87 in order to maintain a constant A. C. operating voltage to the amplifier 80.

A microammeter 90 (Fig. 1) (having a range 0–200 microamperes) is connected in the output circuit of the amplifier 80 in series with a sensitive operating coil 91 of a single pole, double throw relay 92. The A. C. operating circuit of the D. C. amplifier 80 is adjusted so that the indicating needle of the microammeter 90 assumes the mid-scale position when the potential across the input terminals thereof is zero, that is, when the potential across the probing circuit 89 is zero. The D. C. amplifier is adjusted in this manner because the microammeter 90 is used to indicate merely the existence of a potential difference across its input terminal and not to indicate the actual value of the potential.

When a D. C. amplifier of the type described is used in this manner, it is generally referred to as a "Vacuum Tube Microammeter." The method of obtaining the zero position of the indicating needle of the microammeter 90 and its operation are fully disclosed and described at pages 129 to 132, inclusive, of the book, "Vacuum Tube Voltmeters," by John F. Rider, published by John F. Rider Publisher, Incorporated, New York, 1945.

The microammeter 90 (Fig. 1) is provided in the output circuit of the amplifier 80 in order to have a very sensitive indicating means connected across the probes 75 and 76. This sensitive indicating means, consisting of the amplifier 80 and the microammeter 90, is needed to give a substantial indication of the very small potential drop existing across the portion of the copper shield engaged by the probes 75 and 76. In other words, a very slight change in the potential applied across the input terminals of the amplifier will effect a substantially greater deflection of the indicating needle of the microammeter 90. For this reason, the current responsive relay 92 is provided for protecting the microammeter from excessive output currents which may occur during the warm-up period of the amplifier or from the probing circuit 89 during a search for the approximate position of the fault 16 in the insulating jacket.

Since the operating coil 91 of the relay 92 is connected in series with the microammeter 90, it is also subjected to the output current of the amplifier. When an overcurrent condition occurs, the coil 91 actuates an arm 93 so that it engages a contact 94 or a contact 95 depending upon the polarity of the input potential. The relay 92 is provided with an electrically operated latch 96 which serves to latch the arm 93 in its respective actuated position. The latch 96 is operated by a reset coil 97 having one side thereof connected directly to the bus 33 and the other side connected to one side of a reset button 98, the other side of which is connected to the bus 34.

The arm 93 is connected directly to the bus 33, whereas the contact 94 is connected to one side of a coil 100 of a relay 101 while the contact 95 is connected to one side of an operating coil 102 of a relay 103. The coils 100 and 102 have their opposite sides connected together and to the bus 34. A contact 104, provided on the relay 101, and a contact 105 provided on the relay 103 are connected in parallel with each other, one side of the parallel circuit being connected directly to one of the output terminals of the amplifier 80 while the opposite side thereof is connected to the movable terminal of a variable resistor 106 which is in turn connected to the other output terminal of the amplifier. In other words, either of the relays 101 and 103, when energized by operation of the arm 93 will connect the resistor 106 directly across the output terminals of the amplifier 80, thereby shunting out the microammeter 90 and protecting it from damage by excessive output currents.

The relay 101 is provided with a second normally open contact 105 which serves to connect an indicating lamp 107 across the control busses 33 and 34 when the relay is energized. The relay 103 also is provided with a second normally open contact 108 which serves to connect an indicating lamp 109 across the control busses 33 and 34 when the relay is energized. The indicating lamps 107 and 109 serve to indicate not only that the current relay 92 has been actuated by an excessive output current of the amplifier 80, but also the polarity of the output current so that the proper A. C. controls of the amplifier may be adjusted to correct the overcurrent condition.

The motor 85 of the timer 86 is connected directly across the control busses 33 and 34 through a contact 110 and an arm 111 of the selector switch 62. An indicating lamp 112 is also connected across the control busses 33 and 34 by means of the contact 110 and the arm 111 of the switch 62 serves to indicate when the probing circuit 89 is being used to locate the approximate position of the fault 16. The timing motor 85 also drives a cam 113, which serves to bridge a pair of contacts 114—114 and thereby control the continuity of an indicating lamp 115 which is connected directly to the control busses 33 and 34 through the timer contacts 114—114. Another indicating lamp 116 has one side thereof connected to a second position contact 117 which contact is connected to the third and fourth position contacts engaged by the arm 111 of the switch 62.

It will be noted that the cam 84 of the timer 86 provides an intermittent closure of the probing circuit 89 connecting the probes 75 and 76 to the input terminals of the D. C. amplifier 80, while the cam 113 provides a simultaneous intermittent energization of the indicating lamp 115. In this manner the lighting of the lamp 115 indicates the simultaneous closure of the probing circuit. Each time the cam 84 bridges the contacts 82 and 83 the potential difference existing between the probes 75 and 76 engaging a given length of the copper shield 14 is applied across the input terminals of the amplifier 80, which potential difference will cause the indicating needle of the microammeter 90 to deflect either to the right or to the left of its preset mid-scale position, depending upon the polarity of the potential input to the amplifier. The intermittent operation of the indicating lamp 115 is provided so that the operator of the testing apparatus should observe the movements of the microammeter only when the indicating lamp 115 is lighted.

It is believed to be obvious that as long as the probes 75 and 76 are positioned on a given length of the shield 14 between the outer end A of the cable and the fault 16, there will be sufficient potential difference therebetween to cause a suitable deflection of the microammeter 90. However, when the probes 75 and 76 are moved from the outer end A toward the inner end B, they may assume a position beyond the fault 16 in which case no potential difference would exist between the probes and, consequently, no deflection would occur in the microammeter.

It is believed to be apparent that the probes 75 and 76 must be spaced a suitable distance apart so as to include a substantial portion of the shield 14 and the current flowing therein in order to obtain a potential drop therebetween sufficient to render a suitable deflection on the microammeter. Due to this required spacing of the probes 75 and 76, it is obvious that as the probes are spaced at various points along the shield 14, they may ultimately be spaced so as to straddle the fault 16, in which case the potential drop between the probes would be substantially reduced and a correspondingly slighter deflection would occur in the microammeter.

It has been found that in order to obtain a potential difference across the probing circuit 89 which will give a suitable deflection on the microammeter 90, the probes 75 and 76 must be spaced on the cable about six feet apart. With this spacing of the probes 75 and 76, it is impossible to accurately determine the position of the fault 16, the nearest location of the fault being at some point within the six feet spacing of the probes, when said probes are positioned so as to straddle the fault.

To obtain an accurate location of the fault 16, a low potential ohmmeter circuit is provided, which includes a stepdown transformer 120 having its primary winding 121 connected directly across the control busses 33 and 34. One side of its secondary winding 122 is connected to plates 123 and 124 of a mercury vapor rectifier 125 through resistors 126 and 127, respectively. The other side of the winding 122 is connected directly to one side of a resistor 128. A secondary winding 130 of the filament transformer 53 has the ends thereof connected to filaments 131—131 of the rectifier 125. A tap 132 provided on the secondary winding 130 is connected to the opposite end of the resistor 128, which end is also connected directly to a spring clamp 133 disposed within a hood 134 which is similar to the hood 42 and which is positioned over the inner end B of the cable 10 so that the clamp 133 engages a prepared end of the lead sheath 12. The hood 134 is also provided with an externally operated spring biased clamp 135 like the clamp 41 provided on the hood 42, which clamp grips the outer periphery of the cable 10 and thereby serves to hold the hood on the inner end B of the cable. The described connections of the rectifier 125 serve to supply half-wave rectification of the secondary potential of the transformer 120 directly across the resistor 128.

The resistor 128 is provided with a movable tap 136 which is connected directly to an arm 137 of the selector switch 62. When the switch 62 is in such a position that the arm 137 engages its respective first position contact 138, the ohmmeter circuit is open circuited. When the arm 137 engages either its second, third or fourth position contacts 140, 141 or 142, respectively, the ohmmeter circuit is then connected to the ground 38 by a conductor 143, in each case, through an associated variable resistor 144, 145 or 146. The arm 137 serves to selectively connect the resistors 144, 145 or 146 in the ohmmeter circuit in series with the fault 16, and as the arm 137 is moved from its second position contact 140 to its fourth position contact 142, the resistors 144, 145 and 146 are of such value that a correspondingly higher resistance is connected in the ohmmeter circuit, and consequently, in series with the fault 16.

The ohmmeter circuit applies a pulsating D. C. potential across the lead sheath 12 at the inner end B and the copper shield 14 at the outer end A of the cable 10 causing current to flow from the tap 132 of the winding 130 to the lead sheath 12 at the inner end B of the cable, along the lead sheath 12 to the fault 16 in the insulating jacket 13, through the fault 16 to the copper shield 14, along the copper shield to the outer end A of the cable. The circuit continues from the shield at the outer end A of the cable through the ammeter 39 and the conductor 143 to the common connection of the resistors 144, 145 and 146, through the particular resistor which is connected to the contact engaged by the arm 137, through the arm 137 to the movable tap 136 engaging the resistor 128, and through a portion of the resistor 128 to one side of the secondary winding 122. When the arm 111 is moved to engage the second position contact 117 or the third or fourth position contacts connected thereto, the lamp 116 is placed across the control busses 33 and 34, thereby energizing the lamp 116 to indicate that the ohmmeter circuit is now connected to the cable 10 as described above.

Since the contact hoods 42 and 134 are identical in construction, only the contact hood 42, illustrated in Figs. 4, 5, 6 and 7, will be described in detail. The contact hood 42 (Fig. 2) comprises a tubular body 150 made of suitable insulating material having an annular head 151, made of suitable insulating material, secured thereon. A support 152, made of suitable insulating material, is secured to the annular head 151 and has the spring biased clamp 65 securely mounted thereto. The support 152 is positioned on the annular head 151 so that the jaws of the clamp 65 straddle the central axis of the contact hood 42 and, consequently, the tubular body 150. A bearing 153, made of suitable insulating material, and having a bore 154 therethrough is mounted against the inner wall of the body 150 and against the annular head 151 in such a manner that the bore 154 is aligned with a bore 155 provided in the tubular body 150, the central axis of which is diametrically perpendicular to the movable arm 156 of the clamp 65 mounted on the support 152.

A push rod 157 (Fig. 4) is slidably positioned in the bores 154 and 155, having one end thereof projecting inwardly beyond the bearing 153 so as to engage the arm 156 and the other end thereof protruding outwardly beyond the periphery of the body 150 in order that the push rod may be urged inwardly to operate the arm 156 of the clamp 65 when so desired. A metallic support 158 is secured on the outer surface of the annular head 151 and diametrically aligned with the push rod 157. The support 158 is provided with a tapped bore 160 adjacent to the periphery of the body 150 for receiving the threaded portion of the conventional cable grip 161 and has the opposite end 162 thereof turned inwardly toward the opposite end of the body 150 in order to form a guard over the end of the push rod 157. The turned over end 162 of the support 157 serves to prevent accidental operation of the push rod 157 and, consequently, the spring clip 65.

A pair of diametrically opposed cut-outs 163—163 (Fig. 4) provided in the body 150 adjacent to the annular head 151 are covered by a pair of arcuate-shaped members 164—164, made of suitable transparent plastic material, thereby providing a pair of windows in the tubular body 150 at the portion of the body which encloses the clamp 65. In other words, the arcuate-shaped members 164—164 form a pair of windows by means of which the operator of the hood 42 can readily determine when the clamp 65 properly engages the prepared end of the lead sheath 12 when the hood is positioned over the outer end A of the cable 10.

The clamp 41 (Figs. 4 and 5) which engages the copper shield 14 of the cable 10 is mounted on the opposite end of the body 150 in a manner hereinafter to be described. The clamp 41 comprises a pair of arcuate-shaped jaws 165 and 166 having saw teeth formed on the inner edges thereof. Each of the jaws 165 and 166 has one end thereof pivotally mounted on spaced studs 167 and 168, respectively, which studs are threadedly mounted in a support 170 rigidly secured in an upright position on a ring 171. The ring 171 is positioned over the end of the body 150 so that the end of the ring 171 and the end of the body 150 are flush with each other. A rectangular plate 172 is positioned on the studs 167 and 168 and spaced from the support 170 by a tubular spacer 173 positioned over the stud 167 and against an outer surface 174 of the support 170 and a tubular spacer 175 positioned over the stud 168 and against an undercut surface 176 of the support 170.

Figure 6:
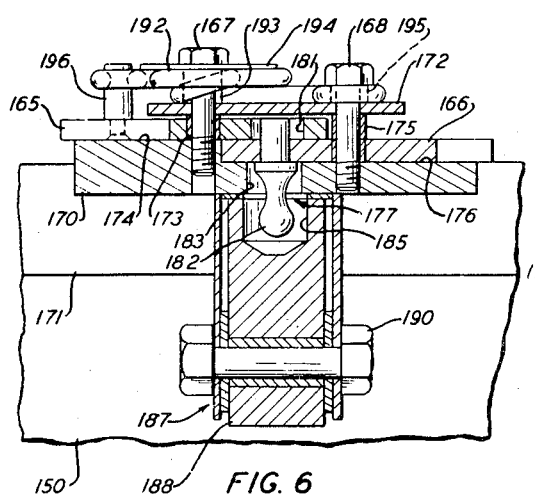
Fig. 6 is a horizontal, sectional view taken along line 6—6 of Fig. 5.

The end of the jaw 165 which is pivotally mounted on the stud 167 is positioned on the support 170 (Fig. 6). The length of the spacer 173 is such that a free-sliding movement of the pivoted end of the jaw 165 between the plate 172 and the support 170 is obtained. The end of the jaw 166 which is pivotally mounted on the stud 168 is positioned between the pivotally mounted end of the jaw 165 and the undercut surface 176 of the support 170. The length of the bushing 175 positioned on the stud 168 is such that a free-sliding movement of the pivoted end of the jaw 166 between the jaw 165 and the support 170 is obtained.

Figures 2, 3, 4:
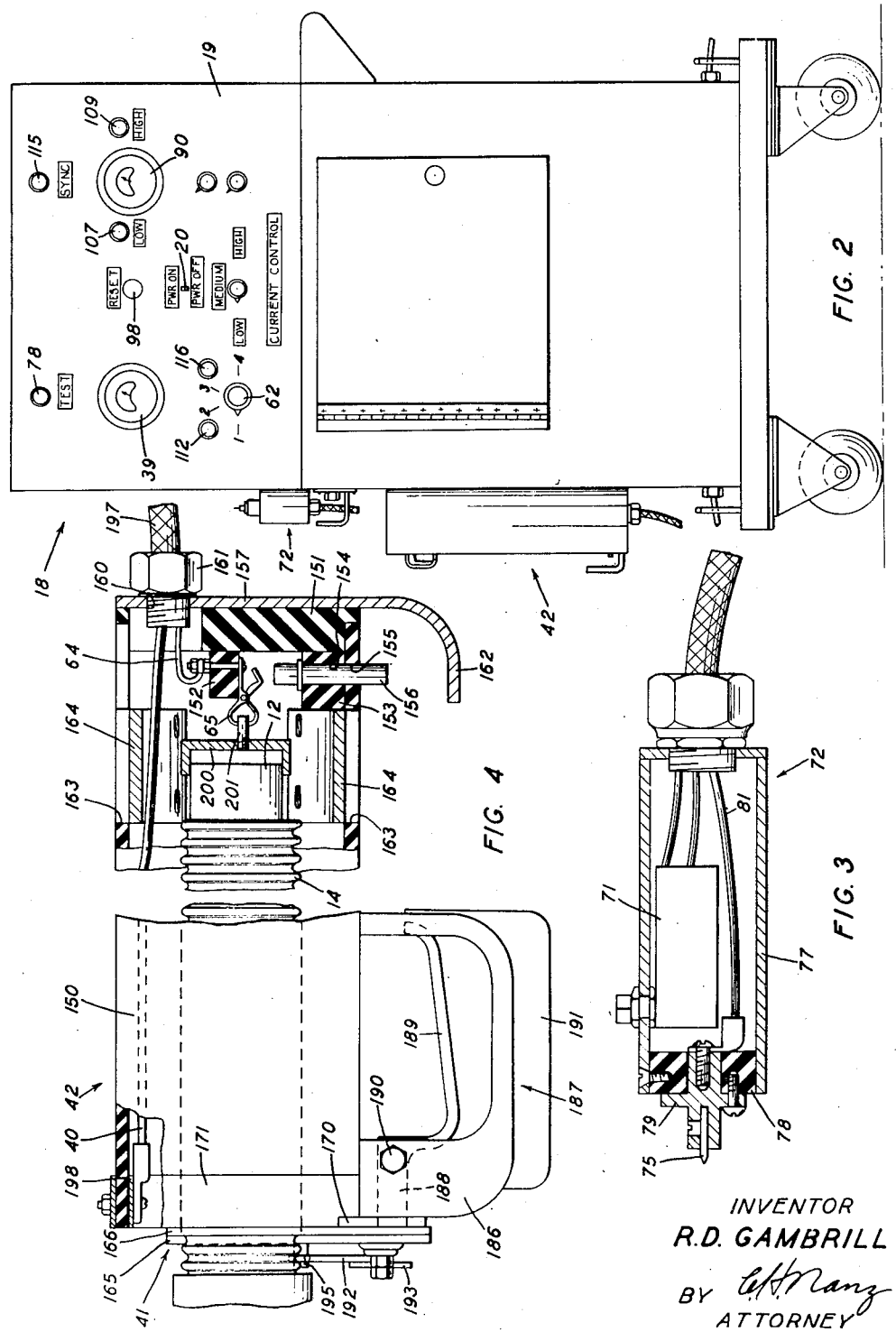
Fig. 2 is a front, elevational view of the housing which encloses the apparatus shown in Fig. 1.
Fig. 3 is an enlarged, vertical, sectional view of a portion of the apparatus shown in Fig. 1.
Fig. 4 is an enlarged, partially sectional view of another portion of the apparatus shown in Fig. 1.
Figure 7:
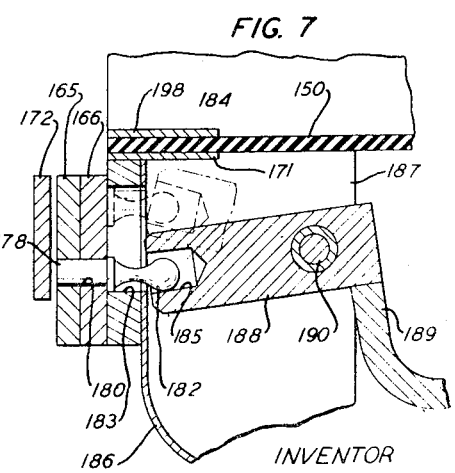
Fig. 7 is a vertical sectional view taken along line 7—7 of Fig. 6.

A hardened steel pin 177 (Figs. 6 and 7) is provided with a cylindrical body portion 178, a portion of which body portion is rigidly secured in a bore 180 provided in the pivotally mounted end of the jaw 166, and a portion of which extends beyond the jaw 166 and slidably engages an elongated aperture 181 provided in the end of the jaw 165 adjacent to its pivot point. The opposite end of the pin 177 is provided with a ball-shaped end 182 which protrudes through an elongated slot 183 (Figs. 5 and 7) provided in the support 170 and a similar slot 184 provided in a leg 185 of a U-shaped handle 186 which is secured to the support 170 and the ring 171. The end 182 engages an oval-shaped socket 187 provided in a crank 188 forming part of a manually operable lever 189 (Figs. 4 and 7).

The lever 189 is pivoally mounted between opposite walls of the leg 185 of the U-shaped handle 186, having a channel-shaped cross section, by means of a stud 190. A grip 191 is secured on the outer surface of the U-shaped handle 186 in order to provide better leverage on the lever 189. A torsion spring 192 is centrally positioned around a bushing 193 positioned on the stud 167 and under a washer 194 secured under the head of the stud 167. One end of the spring 192 is anchored around a bushing 195 positioned between the head of the stud 168 and the plate 172 and the other end of the spring 192 engages a pin 196 rigidly secured in the jaw 165. The bushing 193 permits free movement of the coils of the spring 192 between the washer 194 and the plate 172 when the jaws 165 and 166 are actuated by the lever.

Figure 5:
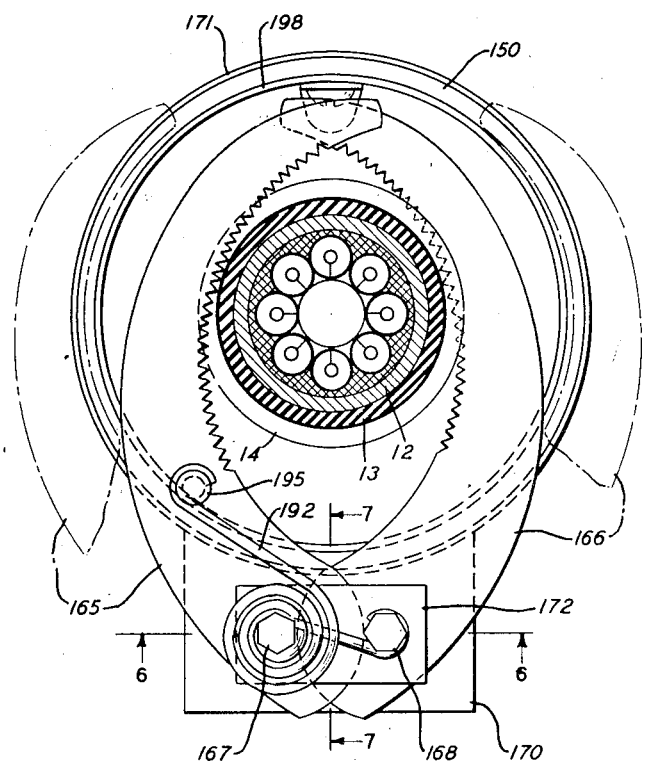
Fig. 5 is a vertical, end view of the apparatus shown in Fig. 4.

The spring 192 tends to maintain the jaws 164 and 166 in a semi-closed position against the periphery of the shield 14 as illustrated in Fig. 5. However, it is believed to be apparent that when the lever 189 is urged toward the under side of the handle 186, the crank 188, being in engagement with the ball-shaped end 182 of the pin 177, urges the pivoted ends of the jaws 165 and 166 toward the central axis of the contact hood 42. In other words, by actuating the lever 189, the free end of the jaws 165 and 166 may be made to assume their respective broken line positions shown in Fig. 5.

The outward movement of the free ends of the jaws 165 and 166 is against the action of the torsion spring 192, whereupon when the lever 186 is released, the spring 192 urges the free ends of the jaws inwardly whereupon their respective saw-toothed edges engage the periphery of the copper shield 14 of the cable 10 (Fig. 6) when the contact hood 42 is positioned on the outer end A of the cable as shown in Fig. 5. A flexible lead 197 is secured in the cable grip 191 and contains the conductor 64 which is secured to the clamp 65 and the conductor 40 which is secured in a suitable manner to a ring 198 mounted on the inside of the tubular body 150. The inner ring 198 and the outer ring 171 are secured to the end of the be bolts and nuts, rivets, or the like, in which case the electrical connection to the inner ring 168 by the conductor 40 is consequently made through these common securing means to the outer ring 171, and consequently to the jaws 165 and 166 mounted on the support 170 secured on the outer ring 171. In this manner the jaws 165 and 166 and the clamp 65 are electrically connected to the electrical apparatus disclosed in Fig. 1 and described hereinabove.

*Operation*

The above-described apparatus operates in the following manner:

The portable testing apparatus 18 described hereinabove is positioned adjacent to a reel containing lightning protected cable, such as the cable 10 shown in Fig. 1 of the drawings, and the contact hoods 42 and 134 are positioned on the outer end A and the inner end B of the cable, respectively, thereby connecting the lead sheath 12 and the copper shield 14 thereof to the testing apparatus. Let it also be assumed that the fault 16 in the insulating jacket 13 was previously ascertained by subjecting the cable 10 to a high voltage breakdown test, in which approximately 15,000 volts D. C. was applied across the copper shield 14 and the lead sheath 12 so as to burn in or char any faults that may be present in the insulating jacket 13.

The testing apparatus is then connected to a suitable low potential A. C. supply so that when the switch 20 is closed, the transformer 25 is energized thereby supplying a low A. C. potential across the control busses 33 and 34. The timer 35 also is energized upon the closure of the switch 20 and begins its timing cycle, which, when completed, energizes the operating coil 36 of the relay 23 causing the contact arms 26 and 27 to engage the stationary contacts 21 and 22 thereby energizing the primary winding 30 of the stepup transformer 31. The transformer 53 is energized simultaneously with the timer 35, and while the timer is completing its timing cycle, the filaments 50 and 51 of the rectifiers 45 and 48, respectively, being connected to the secondary winding of the transformer 53 heat up the rectifiers 45 and 48 and place them in operating condition. When the timer completes its timing cycle, the rectifiers 45 and 48 are sufficiently heated up and are in condition to have the high A. C. potential produced by the secondary winding 36 applied across the plates 44 and 47 thereof.

The rectifiers 45 and 48 serve to provide full wave rectification of the secondary potential of the transformer 31 and supply a high D. C. potential (approximately 4500 volts D. C.) across the D. C. circuit beginning at the tap 37 on the secondary winding 36 and including the ammeter 39, the copper shield 14 of the lightning protected cable 10, the fault 16, the lead sheath 12, the arm 61 of the selective switch 62, the contact arm 60 of the relay 59, the current limiting resistors 56 and 57 and ending at the tap 55 provided on the secondary winding 52 of the filament transformer 53. This high potential circuit connected to the lead sheath 12 and the copper shield 14 is open circuited until the switches 71 and 73 provided on the probe holders 72 and 74, respectively, are closed, in which case the coil 70 is connected directly across the control busses 33 and 34, thereby energizing the coil 70 and causing the contact arm 60 to engage the contact 58.

When the switches 71 and 73 are so operated, the high D. C. potential supplied by the transformer 31 and the rectifiers 45 and 48 is applied directly across the copper shield 14 and the lead sheath 12 of the lightning protected cable 10 and consequently across the fault 16 which exists in the insulating jacket 13 positioned between the lead sheath and the copper shield. The application of the 4500 volts D. C. potential across the lead sheath and the copper shield will break down the previously burned-in fault 16 in the insulating jacket 13 and cause a current to flow from the tap 55 to the lead sheath 12 at the outer end of the cable 10, along the lead sheath 12 to the fault 16, through the fault to the copper shield 14, back along the copper shield to the outer end A thereof, and thence through the ammeter 39 to the tap 37 on the transformer 31. Since the resistance of the fault 16 depends upon the extent to which it was burned-in by the high voltage test, the desired current flow through the fault is obtained by connecting the rectifiers 45 and 48 to the taps provided on the transformer 31 which will produce this current. When the desired current flow has been established through the fault 16, the probe holder 72 is positioned as close to the outer end A of the cable 10 as is permitted by the contact fixture 42 secured thereon so that the probe 75 pierces the "Leno" cloth tape covering 15 and contacts the copper shield 14. The probe holder 74 is positioned on the cable 10 in a like manner approximately six feet from the probe 75 in the direction of the inner end B of the cable 10 so that its probe 76 contacts the copper shield.

When the probes 75 and 76 engage the copper shield 14 in this manner, the probes and the probing circuit 69 associated therewith provide a shunt path for a portion of the current flowing along the copper shield 14 from the fault 16 back to the outer end A of the cable. A potential difference exists across probes 75 and 76, which is directed to the input terminals of the D. C. amplifier 80 through the contacts 82 and 83 provided on the timer 86. The timer 86 is energized simultaneously with the timer 35 and the filament transformer 53 and continues to rotate the cams 84 and 113 as long as the arm 111 of the switch 62 engages the first position contact 110.

Each time the cam 84 bridges the contacts 82 and 83, the potential difference across the probes is applied to the input terminals of the amplifier, which potential disturbs the stable preset operating condition of the amplifier and effects a substantial change in the output current thereof, causing the microammeter 90 connected in the output circuit of the amplifier to be deflected to the right or to the left of its preset mid-scale position depending upon the polarity of the potential difference. It should be noted that when the cam 84 is bridging the contacts 82 and 83, the cam 113 simultaneously bridges the contacts 114—114 of the timer 86 and causes the lamp 115 to be lighted, thereby indicating that the potential difference across the probes is applied to the input terminals of the amplifier only when the indicating lamp 115 is lighted. When the probes contact the current carrying section of the shield 14 in this manner, each time the indicating lamp 115 is lighted, there is a simultaneous deflection of the indicating needle of the microammeter 90, which is noted by the operator of the test set.

After several deflections have been registered by the microammeter in synchronism with the lighting of the lamp 115, the probe holders 72 and 74 are moved from the outer end A of the cable along the outer layer of the cable on the reel, and at each test position of the probes 75 and 76 there is maintained a length of copper shield therebetween of approximately six feet. In other words, as the probes are moved along the outer layer of the cable 10 to various test positions along the shield, the spacing between the probes is maintained fairly constant throughout the probing test. If, after probing the entire outer layer of the cable 10, it is determined that the fault 16 is not in the outer layer of the cable, then the outer layer must be unwound from the reel so that the probes 75 and 76 may engage the copper shield of the next layer of the cable. In any event, regardless of the position of the fault 16 in the cable 10, the probes are moved from the outer end A toward the inner end B, until a position is reached where, with the probes engaging the copper shield 14, no indication of a potential difference between the probes is indicated on the microammeter 90.

When this point has been reached, it is believed to be obvious that the probes 75 and 76 are now positioned on the non-current carrying section of the copper shield 14, that is, the probes are positioned on the shield 14 between the fault 16 and the inner end B of the cable. The probes 75 and 76 are then moved together in small increments back toward the outer end A of the cable until a point on the cable is reached where each time the indicating lamp 95 is lighted, a slight movement of the indicating needle of the microammeter 90 is discernible. This slight movement of the indicating needle indicates that the probes 75 and 76 now straddle the fault 16 as indicated by the broken line positions of the probes in Fig. 1 of the drawings. The small movement of the microammeter needle is due to the fact that, while the length of the copper shield between the probes is still approximately six feet, the probe 75 is in all probability only three or four feet away from the fault 16. Hence, instead of measuring the potential drop across six feet of the copper shield 14, the probes are now measuring the potential drop across approximately three or four feet of the copper shield. Having established the fault to be somewhere between the final positions of the probes 75 and 76, the cable is marked at these points and the probes are disengaged from the copper shield and placed in suitable holders (not shown) provided on the testing apparatus 18.

It is desirable to determine the exact position of the fault in order that the cable 10 may be repaired at that point, since it is highly undesirable to break open the entire six feet established by the probes to determine the exact position of the fault. In order to accomplish this, the switch 62 is actuated so that the arms 61 and 66, 111 and 137 engage their respective second position contacts. The arms 61 and 66 disconnect the timer 86 from the control busses 33 and 34 and open the high potential D. C. circuit connected to and supplied by the rectifiers 45 and 48, respectively. At the same time, the arm 137 closes the ohmmeter circuit supplied with a low D. C. potential by the rectifier 125 and the transformer 120, which potential is applied across the inner end of the lead sheath 12 and the outer end of the copper shield 14. When the arm 137 engages its second position contact 140, it connects the resistor 144 in the low potential circuit in series with the fault 16.

If the resistance of the fault 16 is such that too great a current flow in the ohmmeter circuit is indicated on the ammeter 39, the switch 62 is actuated so that the arm 137 engages its third position contact 141, thereby inserting the higher resistance 145 in series with the fault. Likewise, if the current flowing through the fault is still too high, the switch 62 is actuated so that the arm 137 engages its fourth position contact 142, which inserts the higher resistance 146 in series with the fault. In other words, the switch 62 is actuated until a suitable reading is obtained on the low range scale of the ammeter 39. The low potential circuit has been referred to hereinabove as the ohmmeter circuit because definite amounts of resistance are placed in series with the fault 16 so that the reading of the ammeter is actually a measurement of resistance of the fault.

When the proper current flow has been established in the ohmmeter circuit, an operator begins to apply manual pressure against the leno cloth covering 15 and the copper shield 14 at a point close to the final position of the probe 75 and proceeds to apply this pressure at various points along the cable 10 toward the final position of the probe 76. As the pressure is applied at successive points between the final position of the probes 75 and 76, an intermediate point between the probes is reached, where, when pressure is applied thereat, a substantial change in the value of current flowing in the ohmmeter circuit is indicated by the ammeter 41. This means that the pressure is being applied adjacent to, or substantially over the fault 16, thereby compressing the insulating jacket 13 at or near the fault and bringing the shield 14 closer to the lead sheath 12. This pressure against the shield at or near the fault causes the resistance of the fault to be substantially decreased, whereupon an increased current flow occurs in the ohmmeter circuit.

The application of manual pressure against the cloth covering 15 and the shield 14 at various points around the fault 16 will finally lead to a point where, when pressure is applied thereat, the greatest change of current flow in the ohmmeter circuit will be indicated. Obviously, the point at which the application of pressure renders the greatest change in the flow of current in the ohmmeter circuit is substantially the exact position of the fault 16 in the insulating jacket 13. This point is marked on the cable by the operator, after which the switch 20 is opened to disconnect the testing apparatus from the supply potential and the switch 62 is returned to its normal operating position. The testing apparatus is then moved in position to conduct a similar test on another reel containing lightning protected coaxial cable, while the cable previously tested may be repaired at the point determined by the above-described test.

The contact hoods 42 and 134 described hereinabove are designed to connect the lead sheath 12 and the copper shield 14 of the lightning protected coaxial cable 10 to the testing apparatus 18. Referring to Figs. 1 and 4 it will be noted that the ends A and B of the coaxial cable 10 are prepared in a special manner inherent in the manufacture of such cable. This special preparation of the ends A and B is required in order that the cable may be filled with an inert gas such as hydrogen. The special preparation of the ends of the cable consists of a lead cap 200 which is burned onto the lead sheath 12 and a threaded fitting 201 which is centrally secured on the cap 200. The gas supply is connected to the fitting 201 and after the cable is filled, a plug is threaded into the fitting 201 to keep the gas in the cable. Therefore, to connect the lead sheath 12 to the testing apparatus, the spring clamps 65 and 133 were provided in the contact hoods to engage the fitting 201. Sufficient clearance is maintained between the cap 200 and the conductor core so that the testing current flows only in the lead sheath. It is believed to be apparent that a suitable clamp could be disposed within the contact hood for engaging the periphery of the lead sheath 12 where the ends of the cable being contacted are not prepared in the manner described.

While the above-described testing apparatus is particularly adapted to locate the position of a fault occurring in the insulating jacket positioned between the lead sheath and the copper shield of a lightning protected cable, it may be modified in various ways to test other types of cables without departing from the scope of the invention as defined in the annexed claims.

What is claimed is:

1. The method of locating a previously detected fault in the insulation positioned between a lead sheath and a metallic shield of lightning protected cable, which comprises impressing across the lead sheath and metallic shield of such a cable a potential having an intensity sufficient to break down such a fault and cause a continuous current flow along the lead sheath to the fault in the insulation, through the fault to the metallic shield and along the metallic shield to the same end of the cable, forming a shunt path to measure the potential drop across a length of the shield at various points along the current carrying section of said shield until a portion of the shield is reached at which a substantial decrease occurs in the value of the potential drop across the shunt path, said decrease in the potential drop indicates that the fault lies within the respective portion of the shield included in the shunt path, impressing a second potential across the lead sheath and shield having an intensity sufficient to cause a substantially lower current to flow along the lead sheath from one end of the cable through the fault to the shield and along the shield to the opposite end of the cable, and applying pressure against the shield along that portion thereof in which the decrease in the potential drop occurred until the point where a maximum increase of current flow through the fault occurs, said maximum increase in the current indicating that the fault is directly beneath that point because the resistance of the fault is substantially reduced by the pressure applied to the shield.

2. The method of locating a previously detected fault in the insulation positioned between a lead sheath and a metallic shield of lightning protected cable, which comprises causing a continuous current to flow along the lead sheath from one end of such a cable through a fault in the insulation to the copper shield and along the copper shield to the same end of the cable, forming an external shunt path circuit adapted to measure the potential drop across a selected portion of the current carrying section of the copper shield, amplifying the potential drop across the shunt path circuit, forming said shunt path circuit at various points along the copper shield until a portion of the shield is reached at which a substantial decrease in the potential drop thereacross occurs indicating that the fault in the insulation lies within that portion of the cable, causing a substantially lower value of current to flow along the lead sheath from one end of the cable through the fault to the shield and along the shield to the opposite end of the cable, measuring the current flowing through the fault, and applying pressure along that portion of the shield at which the decrease in the potential drop occurred until a maximum increase in the current flowing through the fault occurs, said maximum change in the current flow through the fault indicating that the pressure is being applied directly over the fault, whereby the exact position of the fault is determined.

RICHARD D. GAMBRILL.

REFERENCES CITED

The following references are of record in the file of this patent:

UNITED STATES PATENTS

| Number | Name | Date |
|---|---|---|
| 754,402 | Wiseman | Mar. 8, 1904 |
| 1,407,693 | Jones | Feb. 28, 1922 |
| 1,754,419 | Henneberger | Feb. 4, 1930 |
| 1,919,802 | Pfeiffer | July 25, 1933 |
| 2,020,402 | Edwards et al. | Nov. 12, 1935 |
| 2,120,391 | Butterfield | June 14, 1938 |
| 2,123,910 | Peters | July 19, 1938 |
| 2,125,630 | Gooding | Aug. 2, 1938 |
| 2,199,106 | Jones | Apr. 30, 1940 |
| 2,199,846 | Borden | May 7, 1940 |
| 2,420,055 | Sanders | May 6, 1947 |
| 2,451,953 | Ingram | Oct. 19, 1948 |

FOREIGN PATENTS

| Number | Country | Date |
|---|---|---|
| 306,679 | Germany | July 9, 1918 |
| 576,708 | Great Britain | Apr. 16, 1946 |
| 691,408 | France | Oct. 21, 1930 |